(12) United States Patent
Kim et al.

(10) Patent No.: US 11,894,734 B2
(45) Date of Patent: Feb. 6, 2024

(54) METHOD OF MANUFACTURING STATOR AND DEVICE FOR MANUFACTURING STATOR

(71) Applicants: HYUNDAI MOBIS CO., LTD., Seoul (KR); HAYASHI KOGYOSYO Co., Ltd., Gifu (JP)

(72) Inventors: Yong Ho Kim, Yongin-si (KR); Min Mo Koo, Yongin-si (KR); Ko Kajita, Gifu (JP)

(73) Assignees: HYUNDAI MOBIS CO., LTD., Seoul (KR); HAYASHI KOGYOSYO Co., Ltd., Gifu (JP)

( * ) Notice: Subject to any disclaimer, the term of this patent is extended or adjusted under 35 U.S.C. 154(b) by 59 days.

(21) Appl. No.: 17/705,945

(22) Filed: Mar. 28, 2022

(65) Prior Publication Data
US 2023/0155460 A1 May 18, 2023

(30) Foreign Application Priority Data
Nov. 16, 2021 (KR) ........................ 10-2021-0157551

(51) Int. Cl.
*H02K 15/04* (2006.01)
*B21F 23/00* (2006.01)
*H02K 15/085* (2006.01)

(52) U.S. Cl.
CPC ......... *H02K 15/0464* (2013.01); *B21F 23/00* (2013.01); *H02K 15/085* (2013.01); *Y10T 29/53143* (2015.01)

(58) Field of Classification Search
CPC .. H05K 15/026; H05K 15/04; H05K 15/0435; H05K 15/0442; H05K 15/045; H05K 15/0464; H05K 15/06; H05K 15/062; H05K 15/063; H05K 15/065; H05K 15/066; H01F 41/064; H01F 41/098; Y10T 29/49009; Y10T 29/49071; Y10T 29/49073; Y10T 29/53143
See application file for complete search history.

(56) References Cited

U.S. PATENT DOCUMENTS

| | | | | |
|---|---|---|---|---|
| 2005/0061907 A1* | 3/2005 | Hashimoto | .......... | H02K 15/022 242/590 |
| 2007/0101569 A1* | 5/2007 | Hashimoto | ............ | H02K 15/06 29/606 |
| 2009/0267441 A1* | 10/2009 | Hiramatsu | ........... | H02K 15/066 310/215 |

* cited by examiner

*Primary Examiner* — Jeffrey T Carley
*Assistant Examiner* — Joshua D Anderson
(74) *Attorney, Agent, or Firm* — NSIP Law (57) ABSTRACT

Provided is a device for manufacturing a stator, the device including a winding jig configured to wind a coil and to manufacture a winding coil, and an insertion jig configured to receive the winding coil from the winding jig and to insert the winding coil into a stator core, wherein the winding jig comprises a body extending along a longitudinal direction (L1), a power supply unit configured to make the body revolve around a central shaft of the body, and a protrusion formed on a surface of the body.

15 Claims, 9 Drawing Sheets

METHOD OF MANUFACTURING STATOR AND DEVICE FOR MANUFACTURING STATOR

CROSS-REFERENCE TO RELATED APPLICATION(S)

This application claims the benefit under 35 USC § 119(a) of Korean Patent Application No. 10-2021-0157551, filed on Nov. 16, 2021, in the Korean Intellectual Property Office, the entire disclosure of which is incorporated herein by reference for all purposes.

BACKGROUND

1. Field

Exemplary embodiments relate to a method of manufacturing a stator and a device for manufacturing a stator and, more particularly, to a method of manufacturing a stator provided with a winding coil and a device for manufacturing the stator.

2. Description of Related Art

Motors converting electric energy into kinetic energy include stators and rotors. In order to enhance efficiency of such a motor and reduce energy loss that occurs in a coil wound around a stator, a space factor of the coil disposed in a stator core needs to be improved.

Also, according to the related art, in order to insert a coil into a stator core having slots, the coil in a wound state is mounted to a separate jig, and then, the jig is inserted into the slots of the stator core. Here, in order to prevent a thin film formed on a surface of the coil from contacting the stator core, a separate insertion member is provided between the stator core and the coil during insertion of the coil.

However, according to the related art, due to high stress that occurs while the coil is inserted into the stator core, the thin film of the coil becomes thinner, and insulation performance of the coil is deteriorated. Also, according to the related art, a considerable force is also applied to the separate insertion member described above during insertion of the coil, and thus, the insertion member needs to be replaced periodically. In addition, the thin film of the coil is scratched by the insertion member, and insulation performance of the coil is deteriorated. Also, according to the related art, when the slots of the stator core are designed, the size and assemblability of the insertion member as well as the outer diameter of the wound coil have to be taken into consideration. Thus, the sizes of the slots are increased, and overall performance of the motor is deteriorated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a device for manufacturing a stator, the device including a winding jig configured to wind a coil and to manufacture a winding coil, and an insertion jig configured to receive the winding coil from the winding jig and to insert the winding coil into a stator core, wherein the winding jig comprises a body extending along a longitudinal direction (L1), a power supply unit configured to make the body revolve around a central shaft of the body, and a protrusion formed on a surface of the body.

The protrusion may have a closed curve shape that extends along a circumferential direction (C1) of the body.

The protrusion may have an open curve shape that extends along a circumferential direction (C1) of the body.

The protrusion may be provided in plurality, and the plurality of protrusions may be spaced apart from each other along the longitudinal direction (L1) of the body.

The protrusion may include an upper surface and a lower surface, and the upper surface may include an upper inclined section inclined downward in a width direction (R1) of the body.

The upper inclined section may be formed at an end of the upper surface away from the body in the width direction (R1).

The lower surface may include a lower horizontal section extending horizontally along the width direction (R1) of the body.

The insertion jig may include a first region having a first recessed portion disposed therein, and a second region coupled to one side of the first region and having a second recessed portion disposed therein.

Each of the first region and the second region may include an upper portion provided in each of upper zones of the first region and the second region, and a lower portion provided in each of the lower zones of the first region and the second region and may be connected to the upper portion, respectively, wherein the first recessed portion may be formed in the lower portion provided in the first region, and wherein the second recessed portion may be formed in the lower portion provided in the second region.

The first region and the first recessed portion may extend longitudinally in a radial direction (R2) of a virtual circle, and the second region and the second recessed portion may extend longitudinally in the radial direction (R2) of the virtual circle.

The first recessed portion or the second recessed portion may be configured such that an inner width (WI) of an inner region in the radial direction (R2) may be different from an inner width (WO) of an outer region in the radial direction (R2).

The first recessed portion or the second recessed portion may be configured such that an inner width (WI) of an inner region in the radial direction (R2) may be greater than an inner width (WO) of an outer region in the radial direction (R2).

The first region or the second region may include a protrusion section formed at an end of the outer region in the radial direction (R2) and may protrudes toward the first recessed portion or the second recessed portion, respectively.

The protrusion section may be provided on each of two inner surfaces defining the first recessed portion in the first region, face each other in a circumferential direction (C2) of the virtual circle, or is provided on each of two inner surfaces defining the second recessed portion in the second region, face each other in the circumferential direction (C2) of the virtual circle.

The widths of two outer surfaces of the lower portion provided in the first region or the second region, may face each other in a circumferential direction (C2) of the virtual circle may be formed uniformly along the radial direction (R2) of the first region or the second region.

In another general aspect, there is provided a method of manufacturing a stator, the method including preparing a coil material and a stator core having a plurality of slots provided along a circumferential direction (C), forming a winding coil by rotating a winding jig after disposing the coil material on an outer surface of the winding jig, wherein one or more protrusion parts arranged along a longitudinal direction (L1) of a body are formed in the winding jig, transferring the winding coil from the winding jig to an insertion jig, wherein the insertion jig comprises a first region that has a first recessed portion having a recessed shape and a second region that has a second recessed portion having a recessed shape and is coupled to one side of the first region, and installing the winding coil into the slots after positioning the winding coil to a region above at least a portion of the plurality of slots, wherein the forming of the winding coil comprises accommodating the winding coil in the first recessed portion and the second recessed portion.

The installing of the winding coil may include lowering the winding coil into the slots by gravity.

The method may include forming a through-hole (G) in a central region of the stator core, and the plurality of slots communicate with the through-hole (G), wherein the installing of the winding coil may include lowering the winding coil into the slots after the winding coil is positioned to the inside of the through-hole (G).

The installing of the winding coil may include the stator core being configured such that the plurality of slots are arranged in a vertical direction, and the winding coil may move in a horizontal direction and is positioned to the inside of the through-hole (G).

The preparing of the coil material may include preparing the coil material using a first material and a second material provided separately from the first material, wherein the winding coil may include a first winding coil provided by winding the first material and a second winding coil provided by winding the second material.

The first winding coil and the second winding coil may be spaced apart from each other with the protrusion part therebetween.

Other features and aspects will be apparent from the following detailed description, the drawings, and the claims.

BRIEF DESCRIPTION OF DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

Hereinafter, a device for manufacturing a stator and a method of manufacturing a stator according to the present disclosure will be described with reference to the drawings.

Device for Manufacturing a Stator

Figure 1:
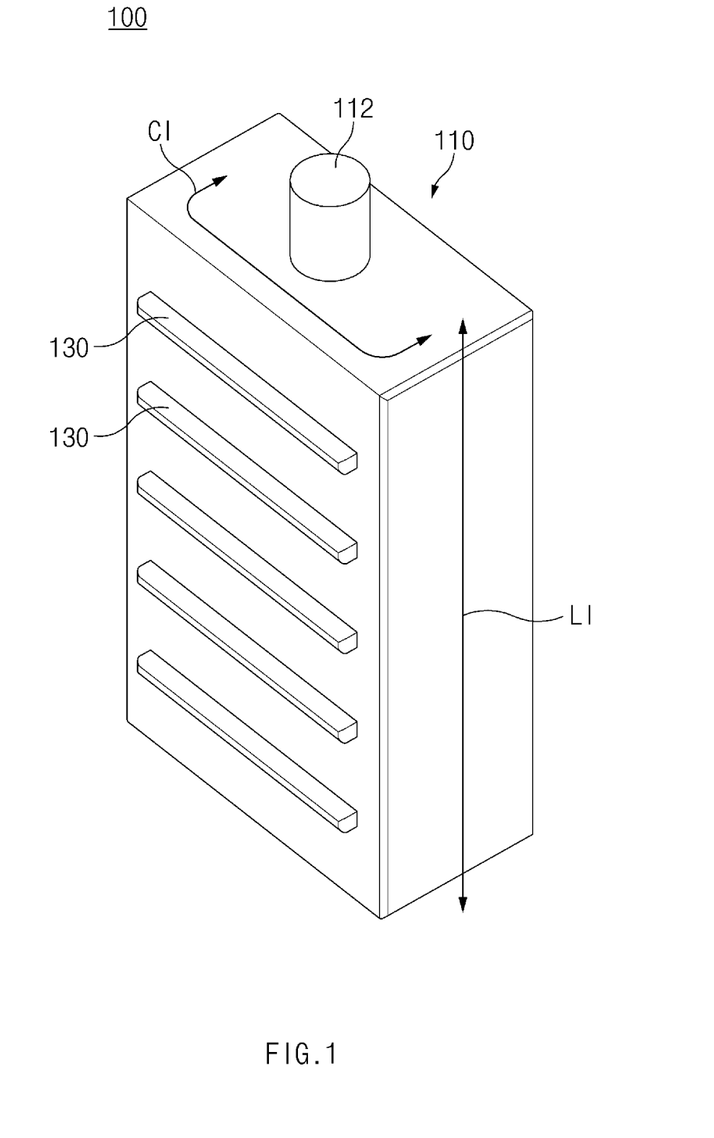
FIG. 1 is a perspective view illustrating a winding jig of a device for manufacturing a stator according to the present disclosure.
Figure 2:
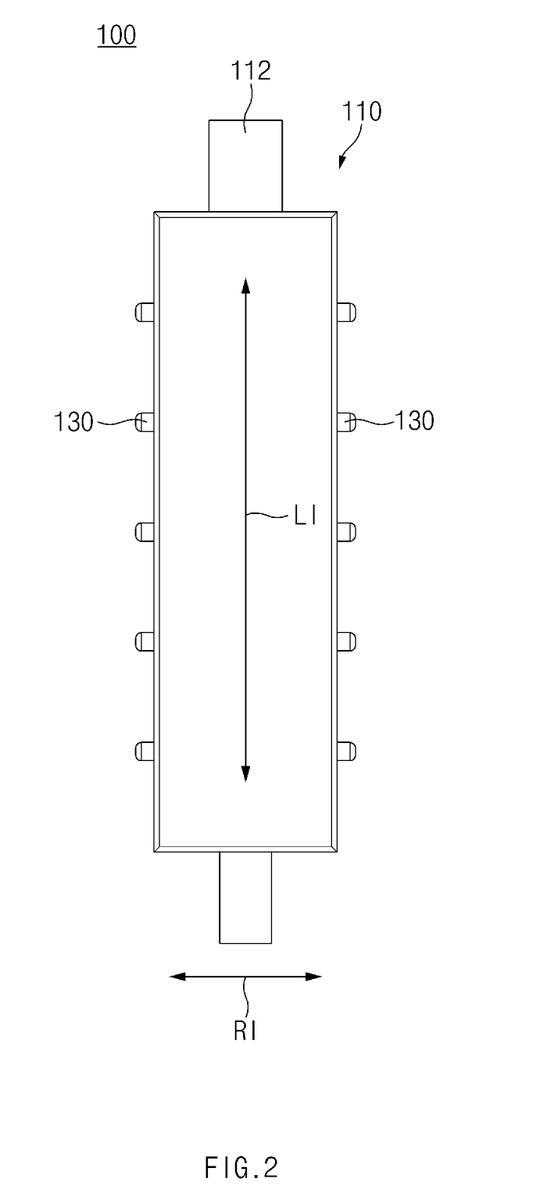
FIG. 2 is a side view illustrating the winding jig of the device for manufacturing a stator according to the present disclosure.
Figure 3:
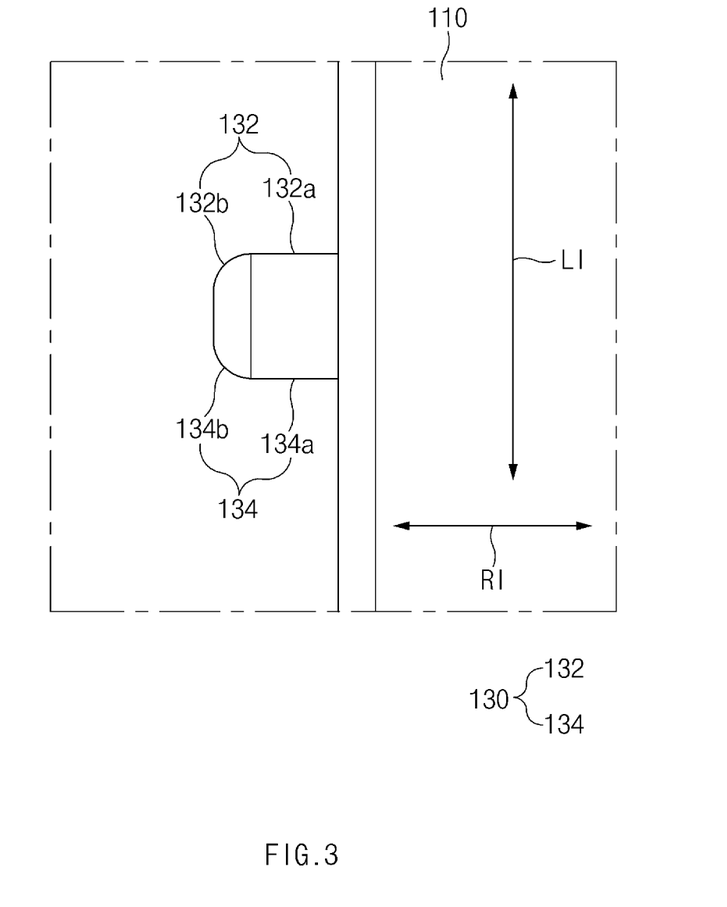
FIG. 3 is an enlarged side view illustrating a protrusion part formed in the winding jig according to the present disclosure.

FIG. 1 is a perspective view illustrating a winding jig of a device for manufacturing a stator according to the present disclosure, and FIG. 2 is a side view illustrating the winding jig of the device for manufacturing a stator according to the present disclosure. FIG. 3 is an enlarged side view illustrating a protrusion part formed in the winding jig according to the present disclosure, and FIG. 4 is a side view illustrating a state in which a winding coil is wound around the winding jig according to the present disclosure.

Referring to FIGS. 1 to 4, the device for manufacturing a stator according to the present disclosure may include a winding jig 100 that winds a coil and manufactures a winding coil. The winding jig 100 may include a body 110 extending along a longitudinal direction L1 and including a central shaft 112, a power supply unit (not shown) that makes the body 110 revolve around the central shaft 112 of the body 110, and a protrusion part 130 formed on a surface of the body 110 and protruding outward.

The body 110 may have a quadrangular pillar shape except for the central shaft 112 as illustrated in FIGS. 1 to 4. However, the body 110 may have various shapes such as a cylindrical shape unlike those illustrated in FIGS. 1 to 4.

Figure 4:
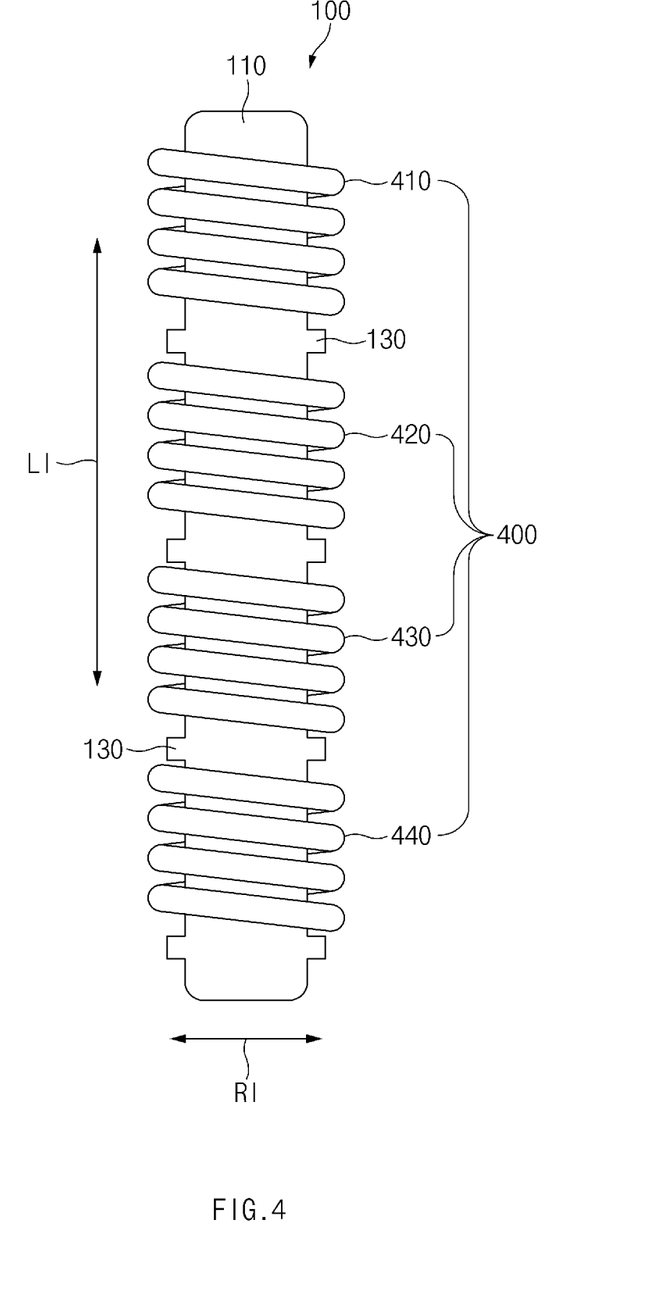
FIG. 4 is a side view illustrating a state in which a winding coil is wound around the winding jig according to the present disclosure.

The protrusion part 130 may be configured such that a plurality of winding coils 400 provided separately are spaced apart from each other along the longitudinal direction L1 of the body 110 as illustrated in FIG. 4. Thus, according to the present disclosure, the plurality of winding coils 400 may be space apart from each other with the protrusion part 130 therebetween.

The protrusion part 130 is provided on the surface of the body 110 and may have a shape extending along a circumferential direction C1 of the body 110. Here, according to an example of the present disclosure, the protrusion part 130 may be formed only in a portion of the circumference of the body 110 as illustrated in FIGS. 1 and 2. This may be understood as meaning that the protrusion part 130 has an open curve shape extending along the circumferential direction C1 of the body 110. For example, when the body 110 has a quadrangular pillar shape, the protrusion part 130 may be formed on only a portion of the four surfaces formed along the circumferential direction C1 of the body 110. FIGS. 1 and 2 illustrate, as an example, a state in which protrusion parts 130 are formed on the two facing surfaces among the four surfaces formed along the circumferential direction C1 of the body 110.

However, according to another example of the present disclosure unlike that described above, the protrusion part 130 may have a closed curve shape extending along the circumferential direction C1 of the body 110. For example, when the body 110 has a quadrangular pillar shape, the protrusion parts 130 may be formed on all of the four surfaces formed along the circumferential direction C1 of the body 110, and the protrusion parts 130 formed on the respective surfaces may be connected to each other.

Continuing to refer to FIGS. 1 to 4, the protrusion part 130 may be provided in plurality. More specifically, the plurality of protrusion parts 130 may be spaced apart from each other along the longitudinal direction L1 of the body 110. FIGS. 1 and 2 illustrate, as an example, a state in which five protrusion parts 130 are provided at equal intervals along the longitudinal direction L1 of the body 110, but the number of the protrusion parts 130 is not limited to that illustrated in the drawing.

Also, as illustrated in FIG. 3, the protrusion part 130 may include an upper surface 132 and a lower surface 134. Here, the upper surface 132 may include an upper horizontal section 132a which extends horizontally along a width direction R1 of the body 110 and an upper inclined section 132b which is inclined downward toward the outside in the width direction R1 of the body 110. The lower surface 134 may include a lower horizontal section 134a which extends horizontally along the width direction R1 of the body 110 and a lower inclined section 134b which is inclined upward toward the outside in the width direction R1 of the body 110. More specifically, the upper horizontal section 132a and the lower horizontal section 134a described above may meet perpendicularly the body 110. The upper inclined section 132b and the lower inclined section 134b may be connected to the upper horizontal section 132a and the lower horizontal section 134a, respectively, and may be formed at an outer end of the upper surface in the width direction R1 of the body 110. Thus, as illustrated in FIG. 3, the outer edge region of the protrusion part 130 in the width direction R1 may have a curved shape. This is to minimize damage to the winding coil due to the protrusion part 130.

Figure 5:
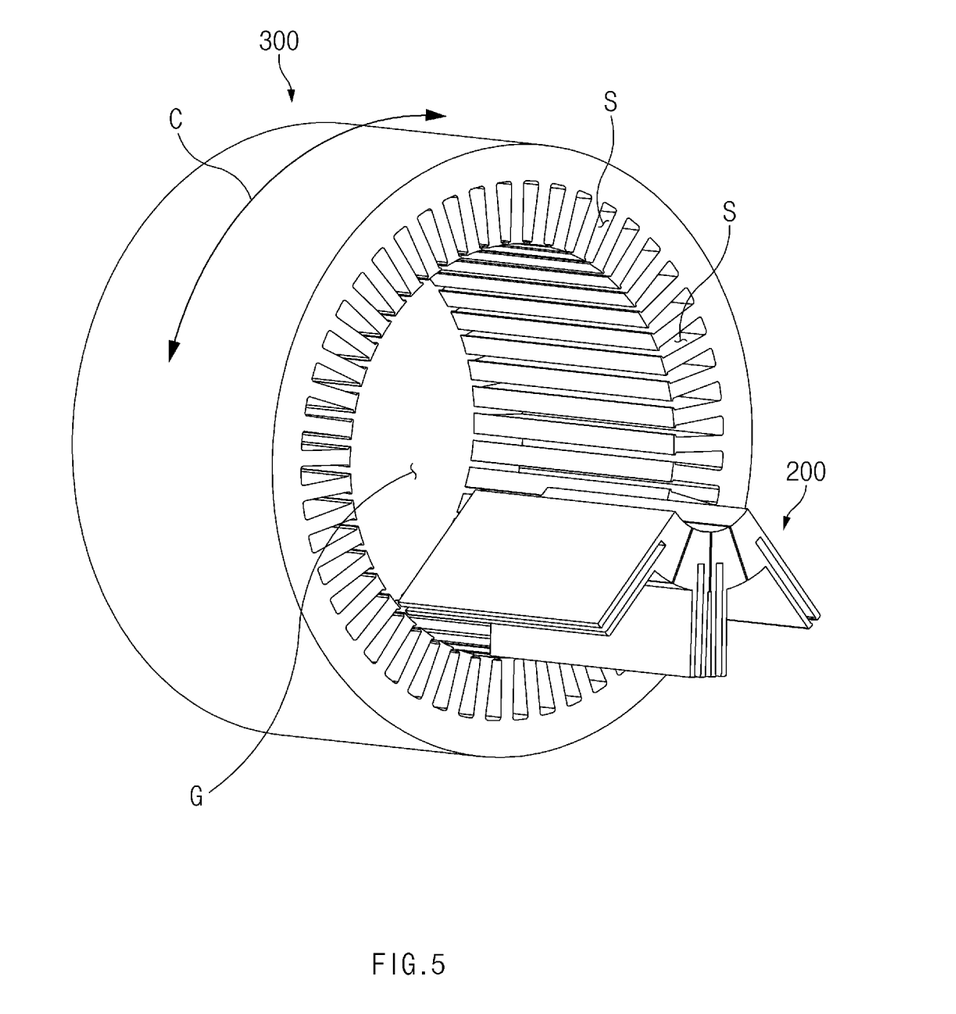
FIG. 5 is a view illustrating a state before an insertion jig of the device for manufacturing a stator according to the present disclosure enters a through-hole of a stator core.
Figure 6:
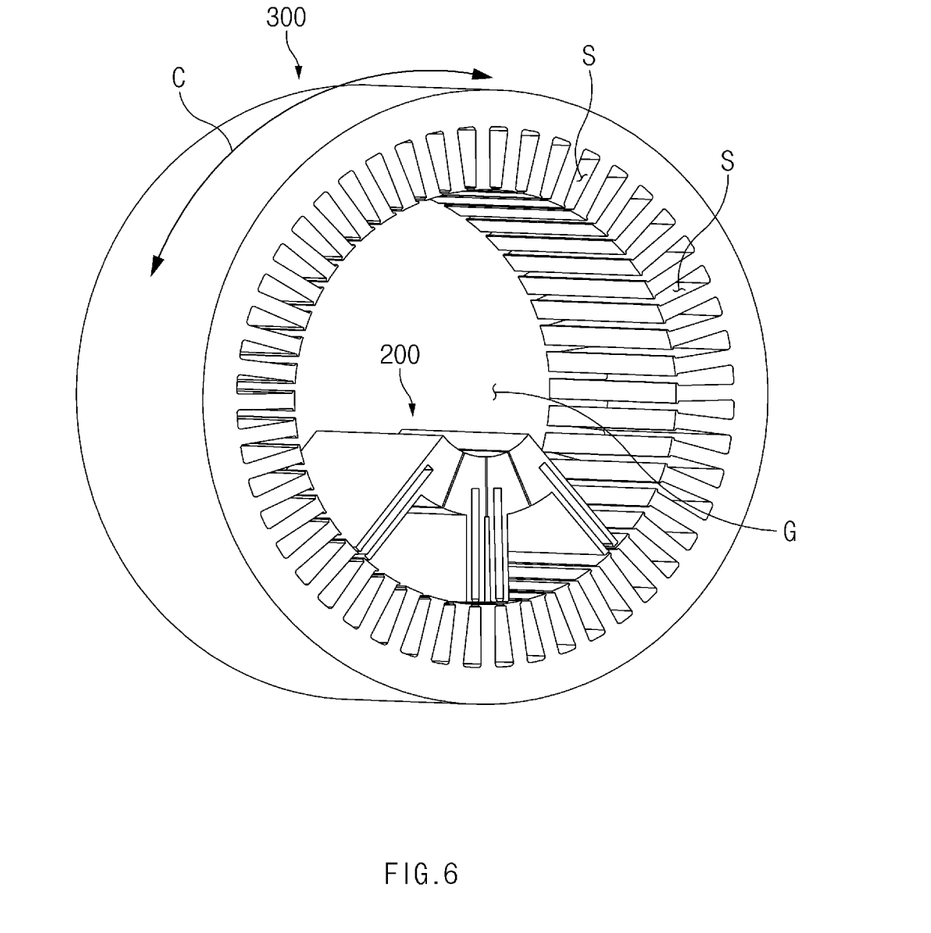
FIG. 6 is a view illustrating a state after the insertion jig of the device for manufacturing a stator according to the present disclosure enters the through-hole of the stator core.
Figure 7:
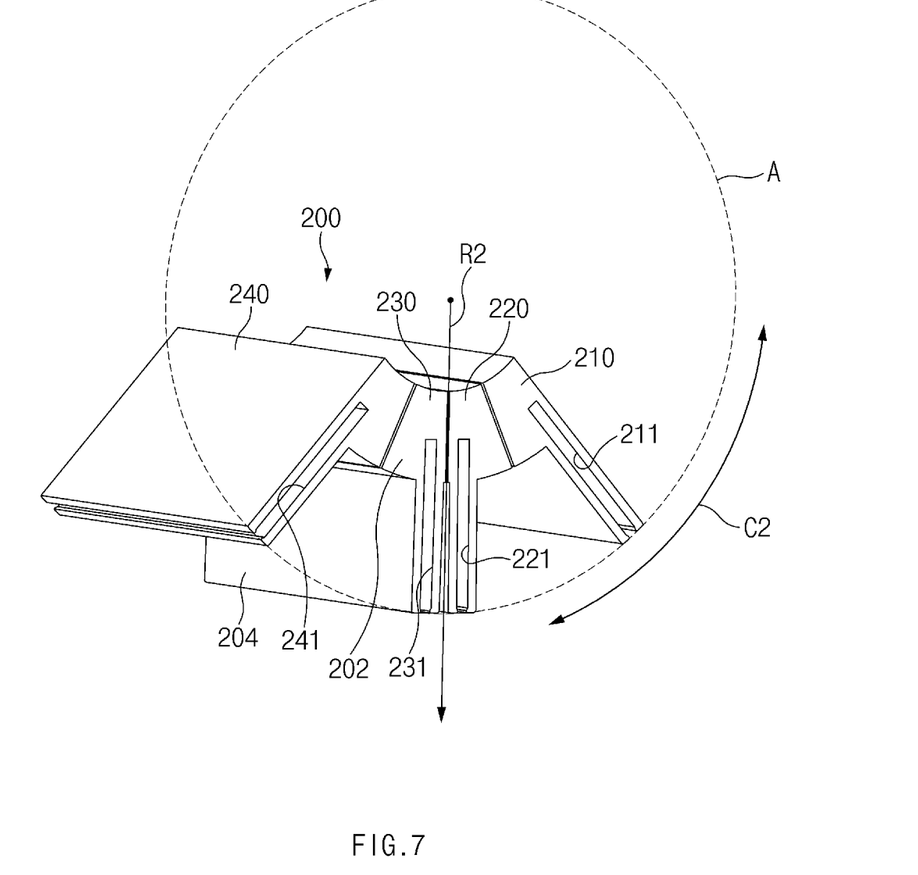
FIG. 7 is a perspective view illustrating the insertion jig of the device for manufacturing a stator according to the present disclosure.
Figure 8:
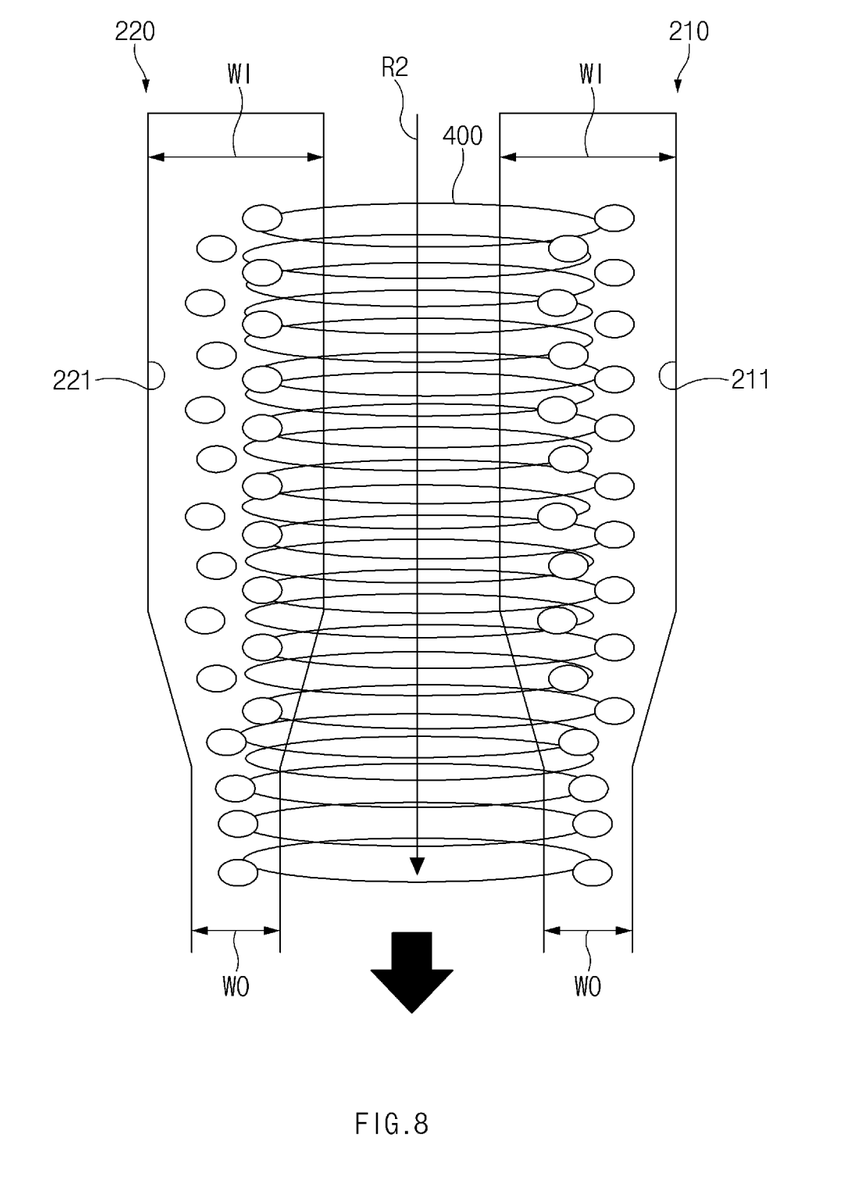
FIG. 8 is a view illustrating a shape of a recessed portion formed in the insertion jig according to the present disclosure and illustrating a state in which winding coils are arranged inside recessed portions.
Figure 9:
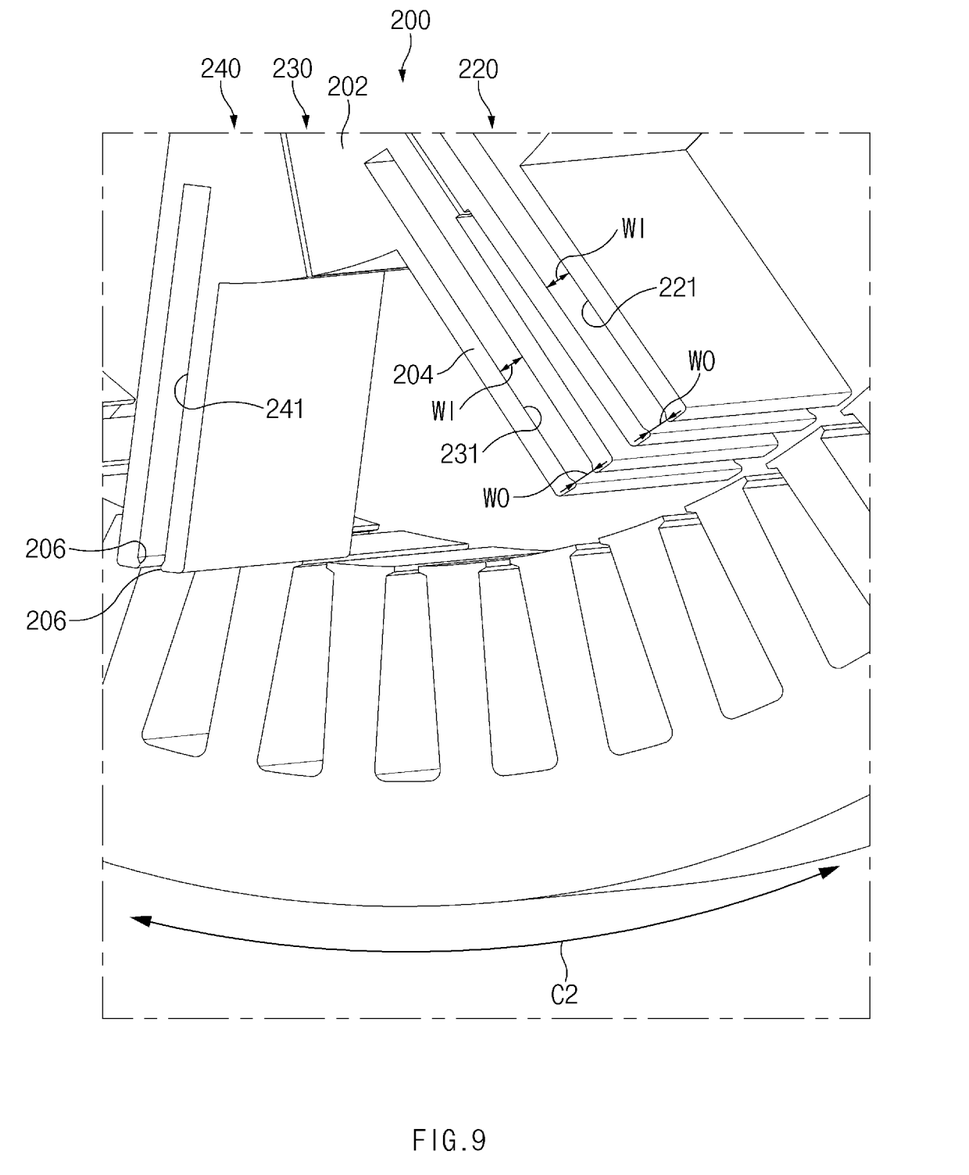
FIG. 9 is an enlarged view illustrating lower portions and protrusion sections of the insertion jig according to the present disclosure.

FIG. 5 is a view illustrating a state before an insertion jig of the device for manufacturing a stator according to the present disclosure enters a through-hole of a stator core, and FIG. 6 is a view illustrating a state after the insertion jig of the device for manufacturing a stator according to the present disclosure enters the through-hole of the stator core. FIG. 7 is a perspective view illustrating the insertion jig of the device for manufacturing a stator according to the present disclosure, and FIG. 8 is a view illustrating a shape of a recessed portion formed in the insertion jig according to the present disclosure and illustrating a state in which winding coils are arranged inside recessed portions. Also, FIG. 9 is an enlarged view illustrating lower portions and protrusion sections of the insertion jig according to the present disclosure.

Referring to FIGS. 5 to 9, the device for manufacturing a stator according to the present disclosure may include an insertion jig 200 which receives the winding coil 400 from the winding jig 100 (see FIG. 1, etc.) and inserts the winding coil 400 into a stator core 300.

According to the present disclosure, the insertion jig 200 may be divided into a plurality of regions. More specifically, the insertion jig 200 may include a first region 210, a second region 220 coupled to one side of the first region 210, a third region 230 coupled to one side of the second region 220, and a fourth region 240 coupled to one side of the third region 230. The insertion jig 200 may have a structure in which the first to fourth regions 210, 220, 230, and 240 are individually manufactured and then assembled. On the other hand, the first to fourth regions 210, 220, 230, and 240 may be integrally formed.

Here, according to the present disclosure, a first recessed portion 211 having an upwardly recessed shape may be formed in the first region 210, and a second recessed portion 221 having an upwardly recessed shape may be formed in the second region 220. Also, a third recessed portion 231 having an upwardly recessed shape may be formed in the third region 230, and a fourth recessed portion 241 having an upwardly recessed shape may be formed in the fourth region 240.

The recessed portions 211, 221, 231, and 241 formed in the insertion jig 200 may form spaces for accommodating the winding coil 400 provided from the winding jig 100.

More specifically, each of the first to fourth regions 210, 220, 230, and 240 may include an upper portion 202 provided in each of upper zones of the first to fourth regions 210, 220, 230, and 240 and a lower portion 204 provided in each of the lower zones of the first to fourth regions 210, 220, 230, and 240 and connected to the upper portion 202. For example, the upper portion 202 and the lower portion 204 may have different widths. FIGS. 5 to 7 illustrate a state in which the width of the upper portion 202 is greater than the width of the lower portion 204.

Also, the first recessed portion 211 may be formed in a lower surface of the lower portion 204 provided in the first region 210, a second recessed portion 221 may be formed in a lower surface of the lower portion 204 provided in the second region 220, a third recessed portion 231 may be formed in a lower surface of the lower portion 204 provided in the third region 230, and a fourth recessed portion 241 may be formed in a lower surface of the lower portion 204 provided in the fourth region 240. FIGS. 5 to 7 illustrate, as an example, a state in which the first to fourth recessed portions 211, 221, 231, and 241 extend to the upper portions 202 provided in the first to fourth regions 210, 220, 230, and 240, respectively. On the other hand, the first to fourth recessed portions 211, 221, 231, and 241 may be formed only in the lower portions 204 provided in the first to fourth regions 210, 220, 230, and 240, respectively.

Also, as illustrated in FIGS. 5 to 7, the first to fourth regions 210, 220, 230, and 240 provided in the insertion jig 200 according to the present disclosure may be sequentially arranged along a circumferential direction C2 of a virtual circle A. In this case, the inner regions of the first to fourth regions 210, 220, 230, and 240 may be arranged toward the center of the virtual circle A, and the first to fourth regions 210, 220, 230, and 240 may be arranged in parallel to a radial direction R2 of the virtual circle A.

More specifically, the first region 210 and the first recessed portion 211 may extend longitudinally in the radial direction R2 of the virtual circle A, and the second region 220 and the second recessed portion 221 may extend longitudinally in the radial direction R2 of the virtual circle A. Also, the third region 230 and the third recessed portion 231 may extend longitudinally in the radial direction R2 of the virtual circle A, and the fourth region 240 and the fourth recessed portion 241 may extend longitudinally in the radial direction R2 of the virtual circle A.

Also, according to the present disclosure, widths of the recessed portions formed in the insertion jig may be different from each other depending on the regions.

More specifically, the first to fourth recessed portions 211, 221, 231, and 241 may be configured such that an inner width WI of an inner region in the radial direction R2 of the virtual circle A is different from an inner width WO of an outer region in the radial direction R2 of the virtual circle A. More preferably, the first to fourth recessed portions 211, 221, 231, and 241 may be configured such that the inner width WI of the inner region in the radial direction R2 of the virtual circle A is greater than the inner width WO of the outer region in the radial direction R2 of the virtual circle A.

As described above, in the device for manufacturing a stator according to the present disclosure, the insertion jig 200 may receive the winding coil 400 from the winding jig 100. Here, the winding coil 400 may have the numbers of wires, which are different from each other depending on regions. Herein, the number of wires represents the number of strands in coils which are arranged along the width direction of the winding coil.

More specifically, according to the present disclosure, in the winding coil 400 accommodated in the recessed portions 211, 221, 231, and 241 of the insertion jig 200, the number of wires in a portion positioned in the inner region in the radial direction R2 may be greater than the number of wires in a portion positioned in the outer region in the radial direction R2. In FIG. 8, regions of the winding coil 400 passing through the page of the drawing are shown as circles for convenience of description. Based on the above, FIG. 8 illustrates, as an example, a case in which the number of wires in the winding coil is one in a portion positioned in the outer region in the radial direction R2 (that is, a region corresponding to WO), and the number of wires in the winding coil is two in a portion positioned in the inner region in the radial direction R2 (that is, a region corresponding to WI).

Continuing to refer to FIG. 9, each of the first to fourth regions 210, 220, 230, and 240 may include a protrusion section 206 which is formed at an end of the outer region in the radial direction R2 and protrudes toward the first to fourth recessed portions 211, 221, 231, and 241.

More specifically, according to the present disclosure, the protrusion section 206 may be provided on each of two inner surfaces which, among inner surfaces defining the first recessed portion 211 in the first region 210, face each other in the circumferential direction C2 of the virtual circle A, or may be provided on each of two inner surfaces which, among inner surfaces defining the second recessed portion 221 in the second region 220, face each other in the circumferential direction C2 of the virtual circle A. Also, the protrusion section 206 may be provided on each of two inner surfaces which, among inner surfaces defining the third recessed portion 231 in the third region 230, face each other in the circumferential direction C2 of the virtual circle A, or may be provided on each of two inner surfaces which, among inner surfaces defining the fourth recessed portion 241 in the fourth region 240, face each other in the circumferential direction C2 of the virtual circle A.

That is, as described above, the first to fourth recessed portions 211, 221, 231, and 241 may be configured such that the inner width WI of the inner region in the radial direction R2 of the virtual circle A is greater than the inner width WO of the outer region in the radial direction R2 of the virtual circle A. This is because the protrusion sections 206 are formed at the end of the outer region in the radial direction R2. That is, according to the present disclosure, the inner width WO of the outer region of the first to fourth recessed portions 211, 221, 231, and 241 in the radial direction R may be defined as the distance between two neighboring protrusion sections 206.

Also, as illustrated in FIGS. 7 to 9, according to an example, each of widths of two outer surfaces which, among outer surfaces of the lower portion 204 provided in each of the first to forth regions 210, 220, 230, and 240, face each other in the circumferential direction C2 of the virtual circle A may be formed uniformly along the radial direction R2 of the first to forth regions 210, 220, 230, and 240.

Method of Manufacturing a Stator

Referring to FIGS. 1 to 9, a method of manufacturing a stator according to the present disclosure may include: a preparation process of preparing a coil material and a stator core 300 having a plurality of slots S provided along a circumferential direction C; a winding process of forming a winding coil 400 by rotating a winding jig 100 after disposing the coil material on an outer surface of the winding jig 100, wherein one or more protrusion parts 130 arranged along a longitudinal direction L1 of a body 110 are formed in the winding jig 100; a transfer process of transferring the winding coil 400 from the winding jig 100 to an insertion jig 100, wherein the insertion jig 200 includes a first region 210 that has a first recessed portion 211 having a recessed shape and a second region 220 that has a second recessed portion 221 having a recessed shape and is coupled to one side of the first region 210; and an insertion process of falling the winding coil 400 into the slots S after positioning the winding coil 400 to a region above at least a portion of the plurality of slots S.

Particularly, in the insertion process described above, the winding coil 400 may fall into the slots S by gravity. Thus, according to the present disclosure, the winding coil 400 may be inserted into the slots S without receiving separate external power in the insertion process, and thus, it is possible to prevent the winding coil 400 from being damaged while the winding coil 400 is inserted into the slots S of the stator core 300.

More specifically, a through-hole G may be formed in a central region of the stator core 300, and the plurality of slots S may communicate with the through-hole G. Here, in the insertion process in the method of manufacturing a stator according to the present disclosure, the winding coil 400 may fall into the slots S after the winding coil 400 is positioned to the inside of the through-hole G. That is, referring to FIGS. 5 and 6, the insertion jig 200, in which the winding coil is inserted, may be positioned in the outside of the through-hole G prior to the insertion process as illustrated in FIG. 5. In the insertion process, the insertion jig 200, in which the winding coil is inserted, may be positioned in the inside of the through-hole G as illustrated in FIG. 6. More preferably, the insertion jig 200 and the winding coil may move in parallel to the page in the insertion process. For this, as illustrated in FIGS. 5 and 6, in the insertion process, the stator core 300 may be configured such that the plurality of slots S are arranged in a vertical direction. In the insertion process, the winding coil moves in a horizontal direction and may be positioned to the inside of the through-hole G.

Also, in the preparation process in the method of manufacturing a stator according to the present disclosure, the coil material may be prepared which includes a first material and a second material provided separately from the first material. Here, in the winding process, the winding coil 400 may be provided which includes a first winding coil 410 provided by winding the first material and a second winding coil 420 provided by winding the second material. Moreover, according to the present disclosure, in the preparation process, the coil material may be prepared which further includes a third material and a fourth material. In the winding process, the winding coil 400 may be provided which further includes a third winding coil 430 provided by winding the third material and a fourth winding coil 440 provided by winding the fourth material.

Particularly, according to the present disclosure, in the winding process, the first winding coil 410 and the second winding coil 420 may be spaced apart from each other with the protrusion part 130 therebetween. When the winding coil includes the first to fourth winding coils 410, 420, 430, and 440, the first to fourth winding coils 410, 420, 430, and 440 may be spaced apart from each other with protrusion parts 130 therebetween in the winding process.

Also, as an example, in the transfer process, in the winding coil 400 accommodated in the recessed portions 211, 221, 231, and 241 of the insertion jig 200, the number of wires in a portion positioned in the inner region in a radial direction R2 of a virtual circle A may be greater than the number of wires in a portion positioned in the outer region in the radial direction R2. This may be because the recessed portions 211, 221, 231, and 241 may be configured such that, due to protrusion sections 206, an inner width WI of the inner region in the radial direction R2 of the virtual circle A is greater than an inner width WO of the outer region in the radial direction R2 of the virtual circle A.

Also, the content described above with respect to the device for manufacturing a stator according to the present disclosure may also be applied, in the same manner, to the method of manufacturing a stator according to the present disclosure, and vice versa.

According to the present disclosure, the insulation performance of the coil may be enhanced by minimizing stress that occurs in the coil when the coil is inserted into the stator core. Also, by deleting the insertion member used in the related art, the sizes of slots formed in the stator core may be minimized while enhancing the insulation performance of the coil.

The present disclosure provides for enhancing insulation performance of a coil by minimizing stress that occurs in the coil when the coil is inserted into a stator core, and further provide for minimizing sizes of slots formed in the stator core, while enhancing the insulation performance of the coil, by deleting an insertion member used in the related art.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A device for manufacturing a stator, the device comprising:
   a winding jig configured to wind coils around the winding jig to manufacture winding coils to be inserted into the stator; and
   an insertion jig configured to receive the winding coils from the winding jig and to insert the winding coils into a stator core to manufacture the stator,
   wherein the winding jig comprises:
   a body extending along a longitudinal direction and a central shaft protruding from one end of the body in the longitudinal direction;
   wherein the body is configured to be revolved around the central shaft to wind the winding coils around a circumference of the body of the winding jig extending perpendicular to the longitudinal direction; and
   a protrusion protruding outward from facing surfaces on opposite sides of the body and extending in the circumferential direction of the body so as to separate the winding coils wound around the winding jig.

2. The device of claim 1, wherein the protrusion has a closed curve shape that extends along the circumferential direction of the body.

3. The device of claim 1, wherein the protrusion has an open curve shape that extends along the circumferential direction of the body.

4. The device of claim 1, wherein the protrusion is provided in plurality, and
the plurality of protrusions are spaced apart from each other along the longitudinal direction of the body.

5. The device of claim 1, wherein the protrusion comprises an upper surface and a lower surface, and
the upper surface comprises an upper inclined section inclined downward in a width direction of the body.

6. The device of claim 5, wherein the upper inclined section is formed at an end of the upper surface away from the body in the width direction.

7. The device of claim 5, wherein the lower surface comprises a lower horizontal section extending horizontally along the width direction of the body.

8. The device of claim 1, wherein the insertion jig comprises:
a first region having a first recessed portion disposed therein; and
a second region coupled to one side of the first region and having a second recessed portion disposed therein.

9. The device of claim 8, wherein each of the first region and the second region comprises
an upper portion provided in each of upper zones of the first region and the second region; and
a lower portion provided in each of the lower zones of the first region and the second region and being connected to the upper portion, respectively,
wherein the first recessed portion is formed in the lower portion provided in the first region, and
wherein the second recessed portion is formed in the lower portion provided in the second region.

10. The device of claim 9, wherein the first region and the first recessed portion extend longitudinally in a radial direction of a virtual circle, and
the second region and the second recessed portion extend longitudinally in the radial direction of the virtual circle.

11. The device of claim 10, wherein the first recessed portion or the second recessed portion is configured such that an inner width of an inner region in the radial direction is different from an inner width of an outer region in the radial direction.

12. The device of claim 10, wherein the first recessed portion or the second recessed portion is configured such that an inner width of an inner region in the radial direction is greater than an inner width of an outer region in the radial direction.

13. The device of claim 10, wherein the first region or the second region comprises a protrusion section formed at an end of the outer region in the radial direction and protrudes toward the first recessed portion or the second recessed portion, respectively.

14. The device of claim 13, wherein the protrusion section is provided on each of two inner surfaces defining the first recessed portion in the first region facing each other in a circumferential direction of the virtual circle, or is provided on each of two inner surfaces defining the second recessed portion in the second region facing each other in the circumferential direction of the virtual circle.

15. The device of claim 10, wherein widths of two outer surfaces of the lower portion provided in the first region and the second region face each other in a circumferential direction of the virtual circle and are formed uniformly along the radial direction of the first region and the second region.

* * * * *